United States Patent Office 3,538,189
Patented Nov. 3, 1970

3,538,189
FIRE RETARDANT POLYESTERS FROM ACYLDI-PHOSPHONIC ACIDS AND POLYHALOBICYCLIC DIACIDS
James Keith Jacques, Walsall, Staffs, England, assignor to Hooker Chemical Corporation, Niagara Falls, N.Y., a corporation of New York
No Drawing. Continuation-in-part of application Ser. No. 470,256, July 7, 1965. This application June 19, 1969, Ser. No. 834,882
Claims priority, application Great Britain, Aug. 6, 1964, 32,081/64; Feb. 2, 1965, 4,520/65
Int. Cl. C08f 21/02
U.S. Cl. 260—869     9 Claims

ABSTRACT OF THE DISCLOSURE

There is provided a fire retardant polyester of ingredients comprising (1) a polycarboxylic acid or anhydride, (2) a polyhydroxy alcohol, (3) a compound of the formula:

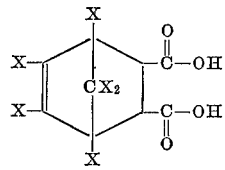

or the corresponding anhydride, wherein X is selected from the group consisting of fluorine, chlorine and bromine, and (4) an organic phosphorus compound of the formula:

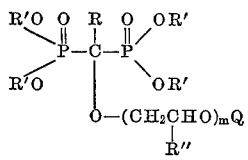

wherein R is selected from hydrocarbon and halo-substituted hydrocarbon groups; each R' is individually selected from the group consisting of hydrogen, R and

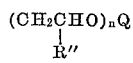

R" is selected from the group consisting of hydrogen, methyl and halomethyl; $n$ is 1 to 20; $m$ is 0 to 20; each Q is individually selected from the group consisting of hydrogen, acyl and alkyl, provided that at least one OH group is present in the compound.

REFERENCE TO PRIOR APPLICATION

This is a continuation-in-part of application Ser. No. 470,256, filed July 7, 1965, now abandoned.

The present invention provides modified polymers having improved flame retardance.

In this specification flame retardance means a reduced tendency to burn when a substance is ignited in a flame which is subsequently withdrawn. The flame retardance may be tested by igniting a strip of material in this manner, allowing the flame to be extinguished and reigniting the material and determining the time taken for the flame to be extinguished at the second ignition. The degree of flame retardance hitherto achieved in many commercially available polyesters has been insufficient to permit such polyesters to be used safely for certain purposes, and even such flame retardance has often only been achieved at the expense of other desirable properties such as strength and flexibility.

Application Ser. No. 470,218, filed July 7, 1965, describes and claims polyesters modified by incorporation therein of units of the formula:

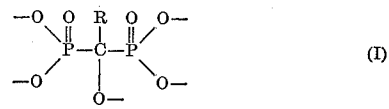 (I)

derived from a hydroxyl group possessing acyldiphosphonic acid or ester of the formula:

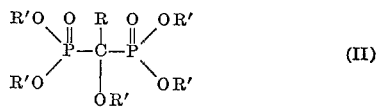 (II)

where R is a hydrocarbon or substituted hydrocarbon group, and each of the R' groups are hydrogen or hydrocarbon or substituted hydrocarbon groups, and preferably a polyalkyleneoxy group. The present invention is an improvement in or modification of the invention of the above-mentioned application.

I have discovered new polyesters, which have an improved measure of flame retardancy, which comprises, in addition to the units I, units of the formula:

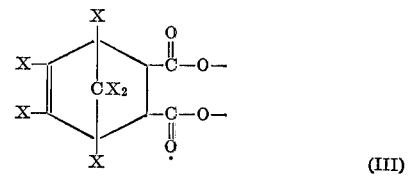 (III)

derived from an acid of the formula

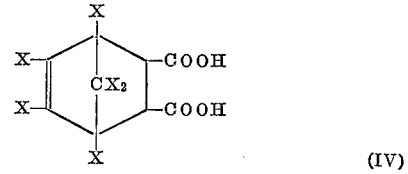 (IV)

where X is a halogen atom.

The term "polyester resin" as used herein refers to that class of polymer formed when polycarboxylic acids or anhydrides react with polyhydroxy alcohols.

Accordingly from one aspect, the invention consists in a modified polyester comprising in the structure thereof: units of the formula:

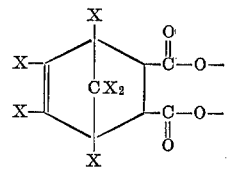

where X is a halogen atom; and units of the formula:

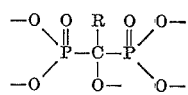

where R is a hydrocarbon or substituted hydrocarbon group. Thus, R can be alkyl such as methyl, ethyl, octyl and the like; arylalkyl such as phenylmethyl and the like; halosubstituted alkyl such as monochloromethyl and the like; and halo-substituted arylalkyl such as p-chlorophenylmethyl and the like. The R groups generally contain 1 to 10 carbon atoms.

The acyldiphosphonic acids (II, R'=H) have four acidic —OH groups, and also a carbon-bonded —OH group, which latter may be acylated by reaction with an acid anhydride or acyl halide, such as acetic anhydride or benzoyl chloride.

The units (I) may be incorporated in polyester molecules by the use of an acyldiphosphonic acid as such, for example by heating a mixture of polybasic acids which comprises an acyldiphosphonic acid and an acid of Formula (IV) and usually an additional $\alpha,\beta$-unsaturated acid or anhydride such as fumaric acid or maleic anhydride, with at least one compound which contains two or more alcoholic hydroxyl groups. Alternatively the acyldiphosphonic acid may be converted into a precondensate which is a hydroxyalkyl ester of an acyldiphosphonic acid. Such precondensates are polyhydric alcohols, and may be reacted with, for example, chlorendic acid or other polybasic acids, or with the anhydrides of such acids, to form a modified polyester of the invention. The functionality of the precondensate may be controlled by acylation of up to four of the alcoholic hydroxyl groups, and that of the acids by esterification with up to four moles of a monohydric alcohol or by acylation of the carbon-bonded hydroxyl group, provided in each case that at least one free —OH group is retained.

The preferred precondensates are those which may be prepared by condensation of an acyldiphosphonic acid (or an acyldiphosphonic acid whose carbon-bonded —OH group has been acylated, or whose phosphorus bonded —OH groups have been partly esterified with a monohydric alcohol) with an $\alpha,\beta$-alkylene oxide as hereinafter specified, followed, optionally, by partial acylation of the resulting polyol. Such preferred precondensates have the formula:

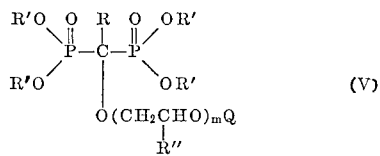

(V)

where R is as defined hereinbefore, each R' is hydrogen, R or a group of the formula

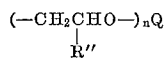

each R" is hydrogen, or a methyl or halomethyl group, n has an average value of from 1 to 20, m has an average value of from 0 to 20, and at least one Q is hydrogen, any remaining Q groups being hydrogen or an acyl or alkyl group of 1 to about 10 carbon atoms.

The acyldiphosphonic acid for use according to our invention may be prepared by reacting a phosphorus trihalide with excess of an anhydrous carboxylic acid, and hydrolyzing the product, or by the action of a carboxylic anhydride or acyl chloride on phosphorus acid.

The preferred acyldiphosphonic acid for use according to the method of our invention is acetyldiphosphonic acid, (II) wherein R=CH$_3$, R'=H. Other diphosphonic acids which can be employed include propionyldiphosphonic acid, phenylacetyldiphosphonic acid, p-chlorophenylacetyldiphosphonic acid, monochloroacetyldiphosphonic acid and octoyldiphosphonic acid.

The alkylene oxides used to prepare the precondensates are preferably ethylene oxide, propylene oxide, epichlorohydrin, epibromohydrin or mixtures thereof. Preferably the alkylene oxides have 2 to 6 carbon atoms.

In addition to esterification by condensation with the phosphorus-bonded hydroxyl groups of the acyldiphosphonic acid, the alkylene oxide can condense with carbon-bonded hydroxyl groups of the acid and/or of any acyldiphosphonic acid/alkylene oxide condensate already formed to give ether or polyether derivatives. Thus where at least 5 molar proportions of alkylene oxide are used the majority of the product will consist of fully esterified acyldiphosphonic acid in which additionally the carbon-bonded hydroxyl group can have been condensed with the alkylene oxide. Where an alkylene oxide in excess of 5 molar proportions is employed and the temperature is allowed to rise above 60 degrees centigrade the product will consist of a mixture of compounds of the general formula:

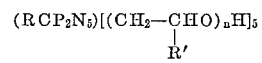

wherein each n has a value greater than 1. The product will include a spectrum of compounds in which the total number of alkyleneoxy units contained therein varies on either side of the number corresponding to the number of molecular proportions of alkylene oxide employed. It is to be understood that references herein to a single compound containing polyalkyleneoxy chains are to be construed as including a reference to mixtures of such compounds with different values of n. The letters n and m given in the Formula (V) denote average values such that $4n+m$ corresponds to the number of molecular proportions of alkylene oxide used in preparing the precondensate.

If it is desired to retain the carbon-bonded hydroxyl group of the acyldiphosphonic acid after condensation, this may be acylated prior to reaction with the alkylene oxide and subsequently hydrolyzed when the reaction with alkylene oxide is complete. If desired, the acyldiphosphonic acid may be esterified with up to four molar proportions of a monohydric alcohol prior to any condensation with alkylene oxide, provided that at least one free —OH group is retained in the resulting ester. Such a monohydric alcohol may, if desired, be a mono-ether or ester of an alkylene or polyalkylene glycol.

The compounds of the Formula (V) where at least one Q group is an acyl group may be prepared from the alkylene oxide condensates by contacting the latter with a carboxylic anhydride or acyl chloride (for example acetyl chloride, propionyl chloride, n-butyryl chloride, benzoyl chloride, p-nitrobenzoyl chloride, acetic anhydride, phthalic anhydride, maleic anhydride, succinic anhydride and the like).

The preferred method of preparation of the precondensate comprises reacting the acyldiphosphonic acid (which may first have been acylated or partly esterified as desired) with at least one molar proportion of alkylene oxide, preferably at a temperature below 60 degrees centrigrade and vacuum stripping to remove any unreacted alkylene oxide. If a product containing polyoxyalkylene chains is desired, more than 5, (preferably less than 20), molar proportions of alkylene oxide should be employed and the reaction temperature allowed to rise during the course of the reaction to 120 degrees centigrade. The reaction cannot be carried out without risk of charring at temperatures higher than 200 degrees centrigrade.

The preferred acid (IV) for use according to our invention is chlorendic acid in which X is Cl. Other acids that may be employed include (IV) where X is Br, F or mixtures of Br and F with Cl. The acids (IV) may be prepared by reacting the appropriate hexahalocyclopentadiene with a polycarboxylic compound containing aliphatic carbon-to-carbon unsaturation, such as maleic anhydride. Suitable compounds (IV) are disclosed in U.S. 2,779,701.

Polyesters according to the invention are conveniently prepared by reacting an acyldiphosphonic acid and chlorendic acid or anhydride (preferably in conjunction with polybasic carboxylic acids or anhydrides thereof such as phthalic anhydride, succinic anhydride or maleic anhydride) with one or more polyhydric alcohols such as ethylene glycol, glycerol, trimethylol propane, polyethylene glycol or with unsaturated alcohols such as butene 1:4 diol, or a precondensate of acyldiphosphonic acid and optionally an alkylene oxide. Alternatively all the acyldiphosphonic acid units may be introduced into the polymer structure by the use of a precondensate of the invention. In the latter instance it is preferred to employ one equivalent of a compound of Formula (V), one equivalent of an additional polyhydric alcohol and two equivalents of the polybasic carboxylic acids or anhydrides.

A particular advantage of preparing a precondensate or a partial ester of an acyl diphosphonic acid and using this to modify a polyester, is that the functionality of such precondensates and esters may be closely controlled over a very wide range by end-stopping one or more of the five —OH groups of the original acyldiphosphonic acid molecule.

For example if a precondensate having five hydroxyl groups is acylated by reacting with three molar proportions of acetyl chloride or benzoyl chloride, the resulting dihydroxy alcohol may be used to make simple linear polyesters. By using precondensates having three or more free hydroxyl groups, polyesters may be prepared having an increased degree of cross-linking. Precondensates having only one hydroxyl group are valuable as chain stoppers for terminating the polymerization reaction. Similarly acyldiphosphonic acids may be esterfied with monohydric alcohols to control the number of —OH groups.

Where an ethylenically unsaturated compound, such as maleic anhydride, is employed in the manufacture of a polyester according to our invention, the resulting polyester may be cured by copolymerization with a vinylic material of 2 to about 20 carbon atoms such as styrene, α-methyl styrene, vinyl toluene, diallyl phthalate, vinyl acetate, methyl methacrylate and the like. This may conveniently be achieved by heating the unsaturated polyester with from 15 to 30 percent of a vinylic material which is preferably styrene in the presence of an initiator such as benzoyl peroxide and a catalyst such as cobalt naphthenate.

It is often advantageous to prepare a copolymer system comprising a mixture of two or more different unsaturated polyesters copolymerized with an ethylenic material such as styrene. One of the component unsaturated polyesters can be the reaction product of: one equivalent of a polyol or mixture of polyols; and one equivalent of or a mixture of acids and/or anhydrides containing a useful proportion of unsaturated acid or anhydride (e.g. maleic anhydride) and an acid of Formula (IV) or its anhydride. The polyol or diol employed may also contain ethylenic unsaturation (e.g. 2-butene-1,4-diol). Another of the unsaturated polyester components may contain units of Formula (I) for example prepared from: one equivalent of a precondensate of Formula (V) or a mixture of polyols comprising a precondensate of Formula (V); together with one equivalent of a polybasic acid or anhydride, or mixtures of acids or anhydrides containing a significant proportion of an unsaturated difunctional acid or anhydride (e.g. maleic acid).

I have found that the degree of flame retardance of a polyester, modified according to my invention, may be enhanced by incorporating therein a further halogen-containing material in addition to the acid of Formula (IV). For example, the precondensate may be formed from an epihalohydrin, particularly from acetyldiphosphonic acid and epichlorohydrin. The precondensate may also advantageously be used in conjunction with a halogen-containing acid, or anhydride such as tetrachlorophthalic anhydride. Modified polyesters according to our invention preferably contain from 0.5 to 5 percent by weight phosphorus and up to 25 percent by weight of halogen.

The invention is illustrated by the following examples in which all proportions are by weight unless otherwise stated. Flame retardance was tested by ASTM D-635-63.

PREPARATION OF ACETODIPHOSPHONIC ESTERS

Example 1

206 grams of anhydrous acetodiphosphonic acid were stirred into 290 grams of propylene oxide contained in a flask. The mixture was allowed to reflux gently without external heating, at a temperature of about 35 degrees centigrade. When all solid material had disappeared, external heat was supplied and the temperature raised gradually to 90–100 degrees centigrade, at which temperature a further 290 grams of propylene oxide were added dropwise with stirring, care being taken to prevent the temperature rising above 100 degrees centigrade. The reaction was nearly complete when propylene oxide was no longer observed to be refluxing in the condenser. The temperature was then raised to 120–130 degrees centigrade which temperature was maintained for two and one-half hours.

Analysis gave: C, 49%; P, 8%.

Example 2

Acetodiphosphonic acid monohydrate (224 grams) was added slowly, with stirring, to epichlorohydrin (11 molar proportions). The temperature was maintained between 110 and 120 degrees centigrade. After a homogeneous clear viscous liquid had been obtained the temperature was raised to the range 120 to 140 degrees centigrade and the excess epichlorohydrin was stripped off under vacuum.

Analysis gave: C, 34.3%; P, 5.1%; Cl, 23.5%.

COMPOSITIONS OF THE INVENTION

Example 3

Maleic anhydride: 0.5 mole, 49 grams.
Phthalic anhydride: 0.4 mole, 59 grams.
Chlorendic anhydride: 0.2 mole, 74 grams.
Acetodiphosphonic acid/epichlorohydrin condensate (1:11 molar proportions) of Example 2: 0.1 mole, 122 grams.
Ethylene glycol: 0.9 mole, 56 grams.

The above formulation was heated for five and one-half hours at 175–190 degrees centigrade in a nitrogen atmosphere to give a clear pale yellow liquid. This was cured with 20 percent of styrene using benzoyl peroxide as catalyst. The resulting resin contained 1.5 percent P and 20 percent Cl and was self-extinguishing in 7 seconds at the second ignition with no measurable spread of flame, whereas a corresponding resin containing the same percent halogen introduced as chlorendic acid only, with no acetodiphosphonic acid was found to be totally flammable at the first ignition.

Example 4

Maleic anhydride: 0.4 mole, 39 grams.
Phthalic anhydride: 0.3 mole, 44 grams.
Chlorendic anhydride: 0.4 mole, 148 grams.
Ethylene glycol: 0.9 mole, 56 grams.
Acetodiphosphonic acid/propylene oxide condensate (1:10 molar proportions) of Erample 1: 0.1 mole, 79 grams.

The above formulation was heated for four and one-half hours at 155–210 degrees centigrade to give a clear golden yellow liquid. On curing with 20 percent of styrene and benzoyl peroxide catalyst a resin was obtained that was self-extinguishing in 5 seconds on the second ignition and showed no measurable spread of flame.

Example 5

Maleic anhydride: 0.4 mole, 39 grams.
Phthalic anhydride: 0.26 mole, 38 grams.
Chlorendic anhydride: 0.28 mole, 104 grams.
Acetodiphosphonic acid: 0.08 mole, 16.5 grams.
Ethylene glycol: 1.1 mole, 68 grams.

This formulation was heated for three and one-half hours at 125–155 degrees centigrade and then cured with 20 percent styrene to give a water white resin which was self-extinguishing in 4 seconds at the second ignition.

I claim:
1. A polyester resin of ingredients consisting essentially of (1) at least one polyhydroxy alcohol, (2) an acid of the formula

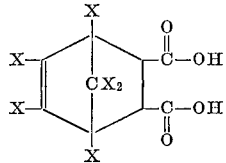

or the anhydride thereof wherein X is selected from the group consisting of chlorine, fluorine and bromine, and (3) an organic phosphorus compound of the formula:

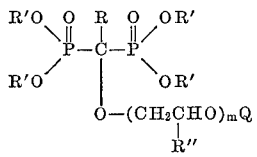

wherein R is alkyl, arylalkyl, halosubstituted alkyl and halosubstituted arylalkyl and R contains 1 to 10 carbon atoms; each R' is individually selected from the group consisting of hydrogen, R and

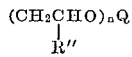

R" is selected from the group consisting of hydrogen, methyl and halomethyl; $n$ is 1 to 20; $m$ is 0 to 20; and wherein each Q is individually selected from the group consisting of hydrogen, acyl and alkyl of 1 to 10 carbon atoms, provided that at least one Q is hydrogen.

2. The polyester of claim 1 wherein said ingredients additionally contain another compound (4) selected from the group consisting of alpha, beta unsaturated polycarboxylic acids, alpha, beta unsaturated polycarboxylic anhydrides, succinic anhydride, phthalic anhydride and mixtures thereof.

3. The polyester of claim 2 wherein X is chlorine, and wherein said compound (4) is ethylenically unsaturated.

4. The polyester of claim 3 wherein R' is hydrogen, Q is hydrogen, and $m$ is 0.

5. The polyester of claim 3 wherein R is methyl.

6. The polyester of claim 5 wherein R" is a monochloromethyl group.

7. The polyester of claim 6 wherein each R' is a group of the formula

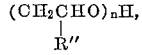

and $n$ and $m$ each have a value of 2 to 5.

8. A polymerizable mixture comprising the polyester of claim 1 and a vinylic compound of 2 to about 20 carbon atoms.

9. A cured polymeric composition comprising the polyester of claim 1 copolymerized with a vinylic compound of 2 to about 20 carbon atoms.

References Cited

UNITED STATES PATENTS

| | | | |
|---|---|---|---|
| 2,931,746 | 4/1960 | Robitschek et al. | 154—43 |
| 3,131,115 | 4/1964 | Robitschek et al. | 161—191 |
| 3,389,192 | 6/1968 | Ziegler | 260—862 |
| 3,433,854 | 3/1969 | Apice | 260—869 |

FOREIGN PATENTS

| | | |
|---|---|---|
| 1,028,620 | 5/1966 | Great Britain. |
| 1,455,979 | 9/1966 | France. |
| Ad. 88,915 | 3/1967 | France. |

WILLIAM SHORT, Primary Examiner

M. GOLDSTEIN, Assistant Examiner

U.S. Cl. X.R.

260—75, 863